(12) United States Patent
Huertgen et al.

(10) Patent No.: US 6,564,122 B1
(45) Date of Patent: May 13, 2003

(54) METHOD AND DEVICE FOR VISUALIZING A DRIVING PATH

(75) Inventors: Bernd Huertgen, Sibbesse (DE); Werner Poechmueller, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/762,014

(22) PCT Filed: Jun. 5, 2000

(86) PCT No.: PCT/DE00/01797

§ 371 (c)(1),
(2), (4) Date: Apr. 10, 2001

(87) PCT Pub. No.: WO00/74976

PCT Pub. Date: Dec. 14, 2000

(30) Foreign Application Priority Data

Jun. 4, 1999 (DE) .......................................... 199 25 584

(51) Int. Cl.$^7$ ................................................. G06F 7/00
(52) U.S. Cl. ............................. 701/1; 701/41; 180/168; 340/461
(58) Field of Search ............................... 701/1, 23, 41; 180/168, 204; 340/435, 436, 461, 525; 348/115, 118, 148

(56) References Cited

U.S. PATENT DOCUMENTS 4,253,541 A * 3/1981 Iida et al. ................... 180/168
6,366,221 B1 * 4/2002 Iisaka et al. ............. 340/932.2

FOREIGN PATENT DOCUMENTS

| DE | 43 36 288 C | 3/1995 | |
| DE | 195 39 642 A1 | 11/1996 | |
| DE | 198 43 564 A | 3/2000 | |
| DE | 198 45 567 A | 4/2000 | |
| JP | 401014700 A | * 1/1989 | ............. 340/932.2 |
| JP | 2000280822 A | * 10/2000 | |

OTHER PUBLICATIONS

Patent Abstract of Japan M–876 Oct. 4, 1989, vol. 13/No. 441.

* cited by examiner

Primary Examiner—Gertrude Arthur
(74) Attorney, Agent, or Firm—Michael J. Striker

(57) ABSTRACT

A method and an apparatus for displaying maneuvering room are proposed, in which a maneuvering course of a vehicle to be expected if a steering angle is unchanged is shown in a display in which at least some of the maneuvering space at the rear of a vehicle is shown. Via the maneuvering course to be expected, a driver is informed in such a way that he can adapt the actual steering angle to an obstacle that can be detected in the maneuvering space at the rear.

11 Claims, 8 Drawing Sheets

METHOD AND DEVICE FOR VISUALIZING A DRIVING PATH

PRIOR ART

Figure 1:
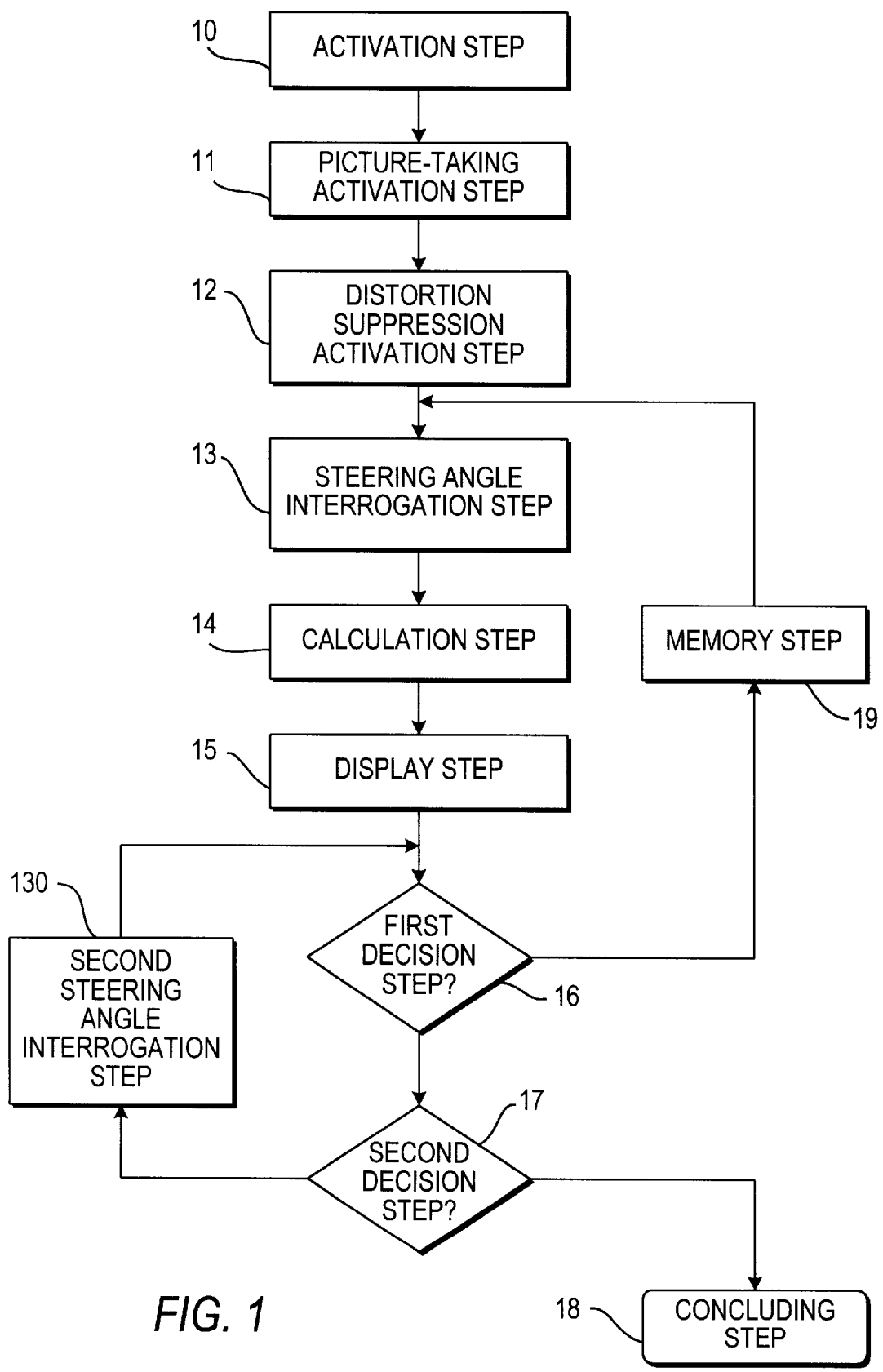

The invention is based on a method for displaying maneuvering room as generically defined by the preamble to the main claim. From German Patent DE 43 36 288 C1, a device for monitoring the space at the rear or front of a motor vehicle as it is being parked is known, in which especially the space at the rear of a motor vehicle being parked is monitored with a camera disposed on the rear part of the vehicle. The camera is connected via a connecting line to a viewing and monitoring device within view of the vehicle driver, so that he can observe the space behind the vehicle. The screen of the viewing and control device is subdivided into fields or quadrants. The camera focuses sharply on obstacles within the picture angle covered. By observing the viewing and control device, the driver can now avoid the obstacles shown on the screen.

ADVANTAGES OF THE INVENTION

The method according to the invention having the characteristics of the main claim has the advantage over the prior art that a vehicle driver is shown which maneuvering course the vehicle under his control will take if the steering angle is unchanged, because the maneuvering course to be expected if the steering angle is unchanged is incorporated into the picture of the maneuvering space at the rear. If there are no obstacles at all within the maneuvering course shown, then the driver can drive backward without having to make any further steering motions and without striking any obstacle. If there are obstacles within the maneuvering course shown, then the vehicle driver can correct the actual steering angle even as he begins to drive slowly, until the maneuvering course to be expected has shifted enough that there is no longer any obstacle within the maneuvering course. If even with a maximum turn of the wheel the driver fails in having all the obstacles located outside the maneuvering course shown, then he will generally not be able to circumvent the obstacle directly. The vehicle is at too unfavorable an angle, too close to the obstacle behind it. The driver can accordingly increase the distance from the obstacle and begin a new attempt at circumventing the obstacle. In other words, the driver can decide directly whether circumventing the obstacle requires correcting the steering angle, or whether a correction he makes is sufficient to circumvent the obstacle. He no longer has to rely only on his subjective assessment of the maneuvering course of the vehicle. On the one hand this can save the time needed for unsuccessful attempts at circumvention resulting from an incorrect assessment by the driver of the location of the vehicle relative to the obstacle. On the other hand, accidents that might be caused by the driver because of an incorrect assessment of the location of the obstacle relative to the vehicle can be avoided.

By the provisions recited in the dependent claims, advantageous refinements of the method disclosed in the main claim are possible. It is especially advantageous to ascertain the steering angle of the vehicle from the actual steering angle of the vehicle steering. Compared to ascertaining that steering angle from the wheel status, for instance, this offers the advantage that especially in vehicles with power steering, electronic detection of the steering angle is sometimes already done, and thus joint use can be made of existing electronic components.

It is also advantageous that in addition to a maneuvering course to be expected if the steering angle is unchanged, the maximum range within which a possible maneuvering course can be located is also displayed. This maximum range is defined by the maximum turn angle of the steering to the left and right. From the display of the maximum range, the vehicle driver can see directly whether with a maximum turn of the steering he can circumvent an obstacle without first making this maximum turn himself. Thus the driver of the vehicle can decide directly whether an obstacle can still be circumvented by a suitable choice of a steering angle, or whether a new attempt should be made from a greater distance and with an approach at a more-favorable angle.

It is also advantageous, along with the portion of the maneuvering space at the rear that is detected by a camera, to detect at least part of the vehicle bumper as well. This serves as a reference point to the driver for where his vehicle is located relative to obstacles displayed, and thus makes orientation additionally easier for him.

It is also advantageous for distortion caused by a camera lens in the ascertained picture to be suppressed by a processor. As a result of this distortion suppression, annoyance to the driver from picture distortion, which ensues especially in the peripheral area of the picture with extreme wide-angle lenses, is avoided. This is because distortion may cause the driver to assess the location of the vehicle incorrectly relative to obstacles displayed.

It is also advantageous that an output signal of the camera is triggered as a function of the brightness, or in other words the intensity of the received light signals, via a nonlinear characteristic curve and in particular a logarithmic characteristic curve. This offers the advantage that the camera can be used over a wide brightness range, and thus the method of the invention can be used even under very low-light conditions as well as very bright light conditions.

It is furthermore advantageous for the display of the picture of the maneuvering space at the rear to be performed in a freely programmable multipurpose instrument. Since this kind of freely programmable multipurpose instrument as a rule has a screen, the display of the picture of the maneuvering space at the rear can be made if needed in a portion of the multipurpose instrument, making it possible to dispense with an additional display in the vehicle.

It is furthermore advantageous to embody an apparatus for performing the method for displaying maneuvering room that has a central control unit. The display and the camera, and in particular the brightness, focus and picture-taking angle of the camera, can be coordinated by means of this control unit. It is also advantageous that the control unit is connected to an input by way of which the display of the possible maneuvering room, or the maneuvering course to be expected if the steering angle is unchanged, can be deactivated, for instance if merely observation of the maneuvering space at the rear is desired while the vehicle is stopped, without any intent to drive.

DRAWING

Figure 2:
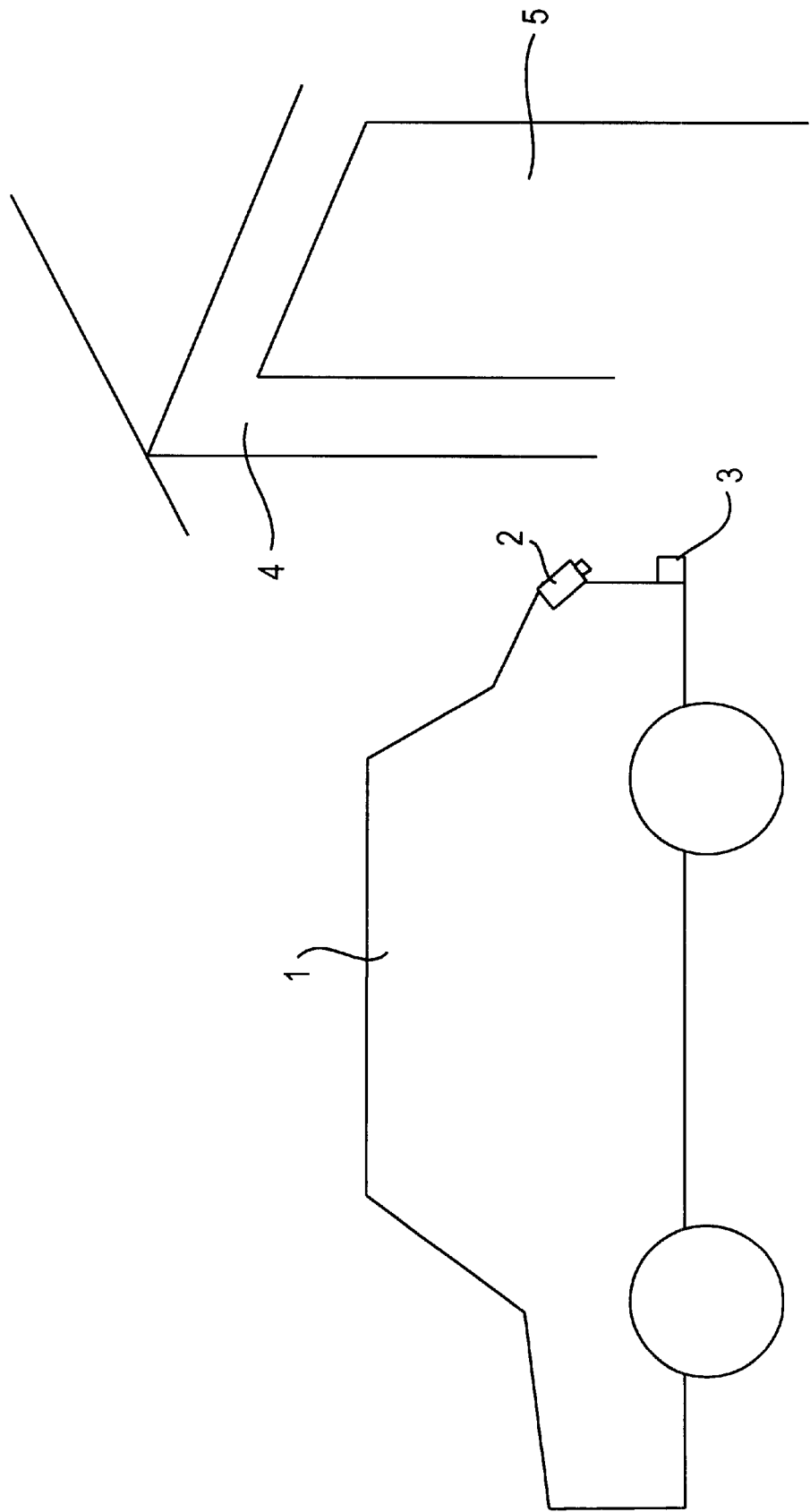
Figure 3:
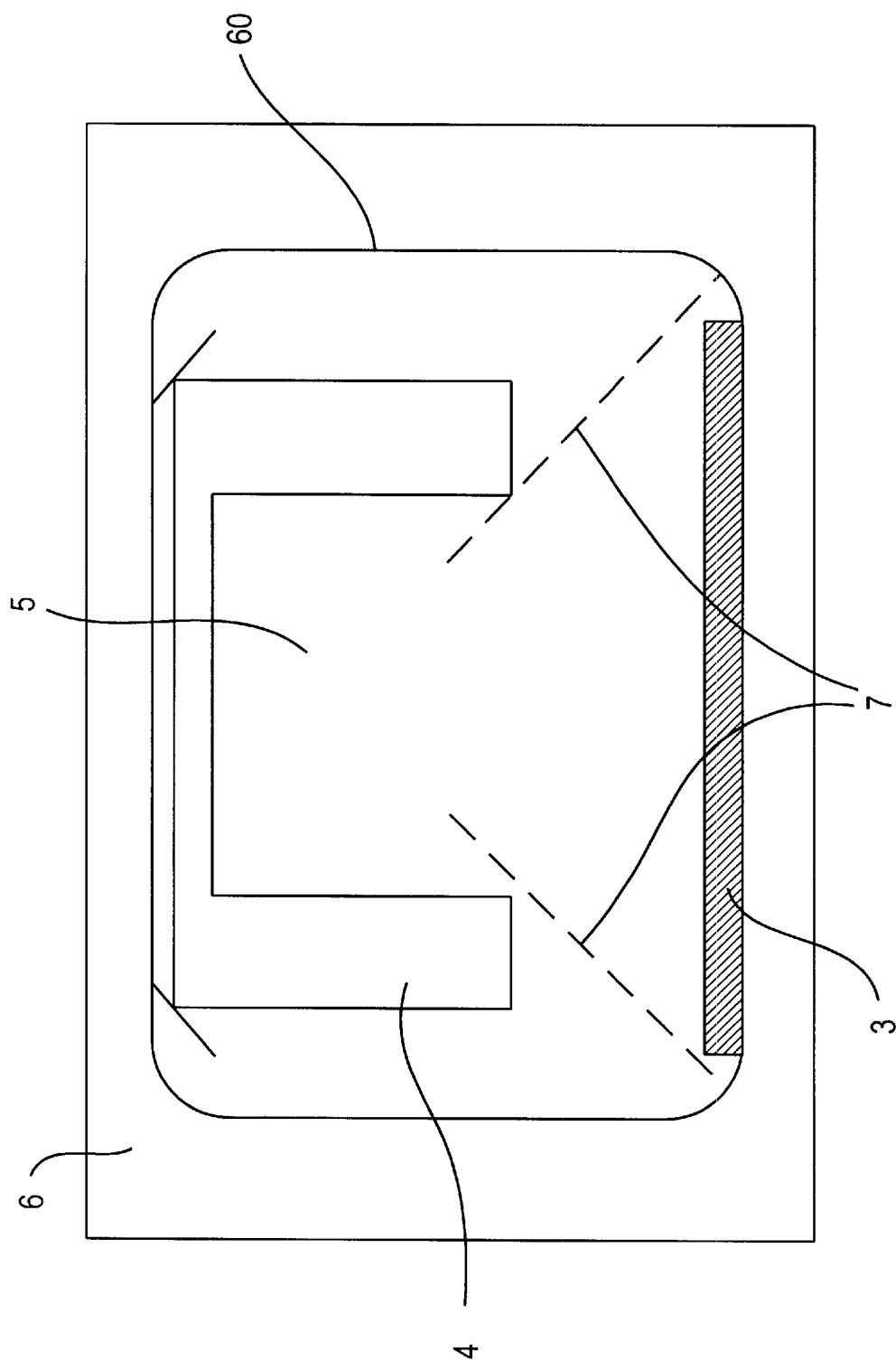
Figure 4:
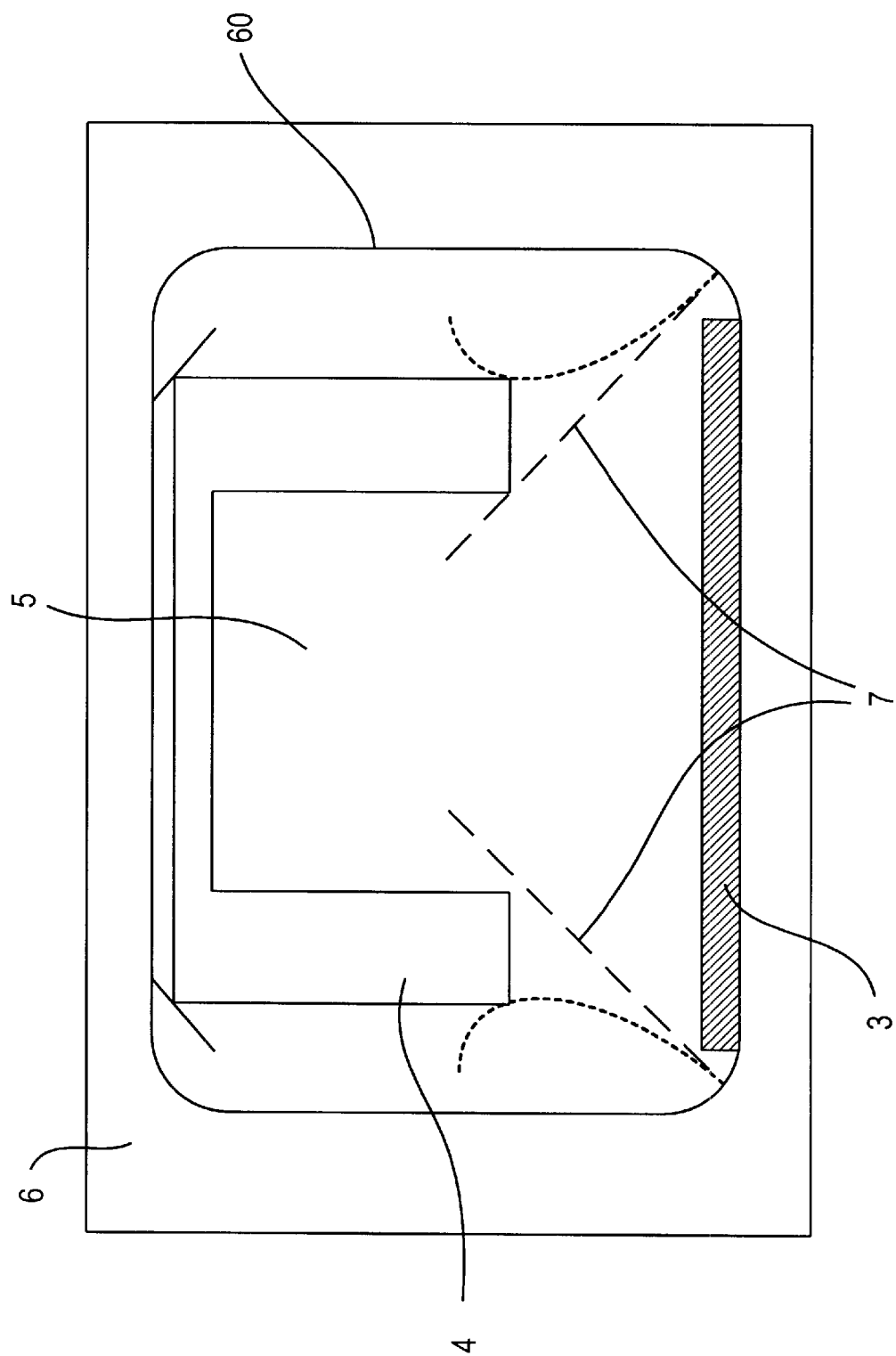
Figure 5:
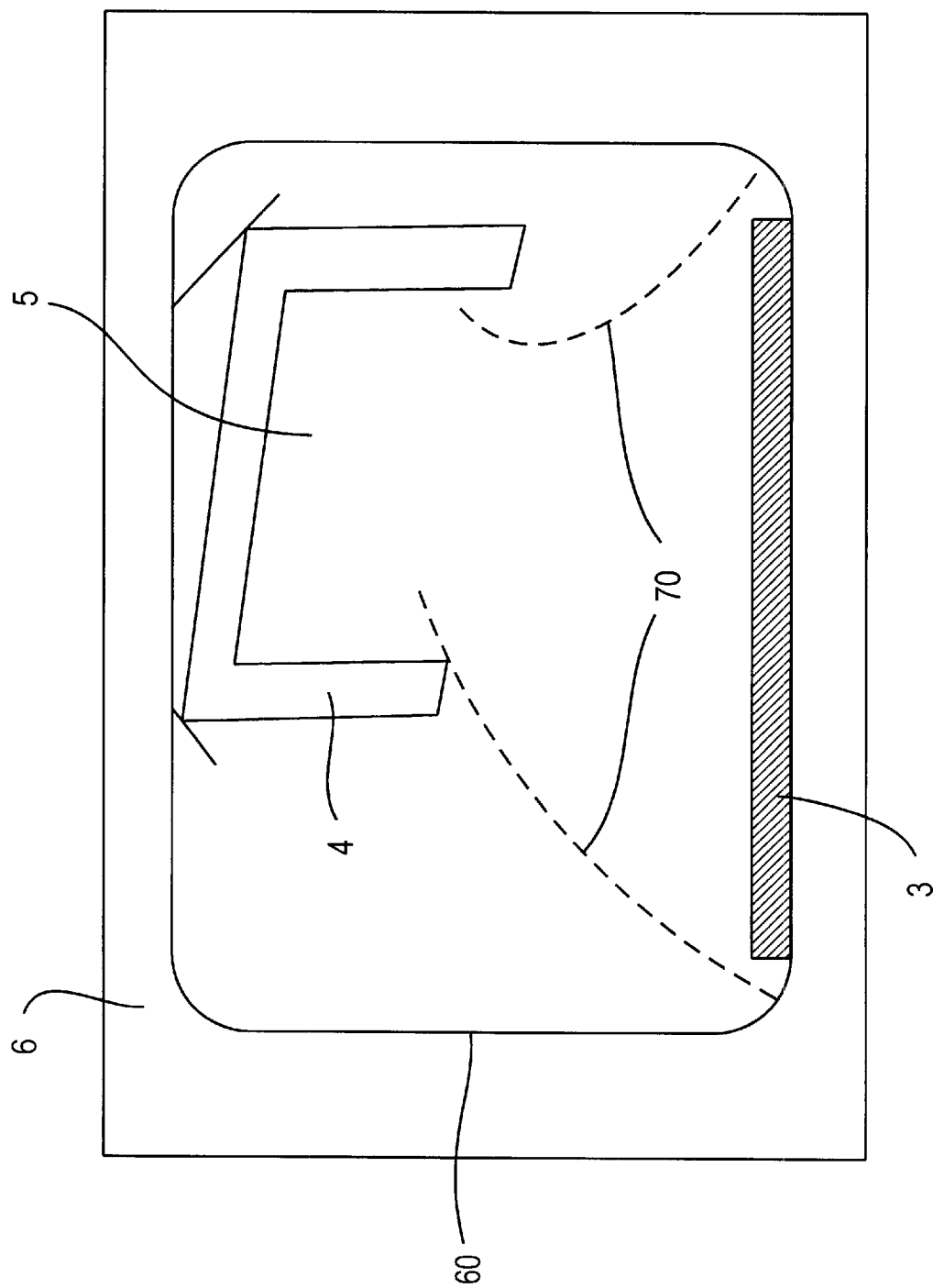
Figure 6:
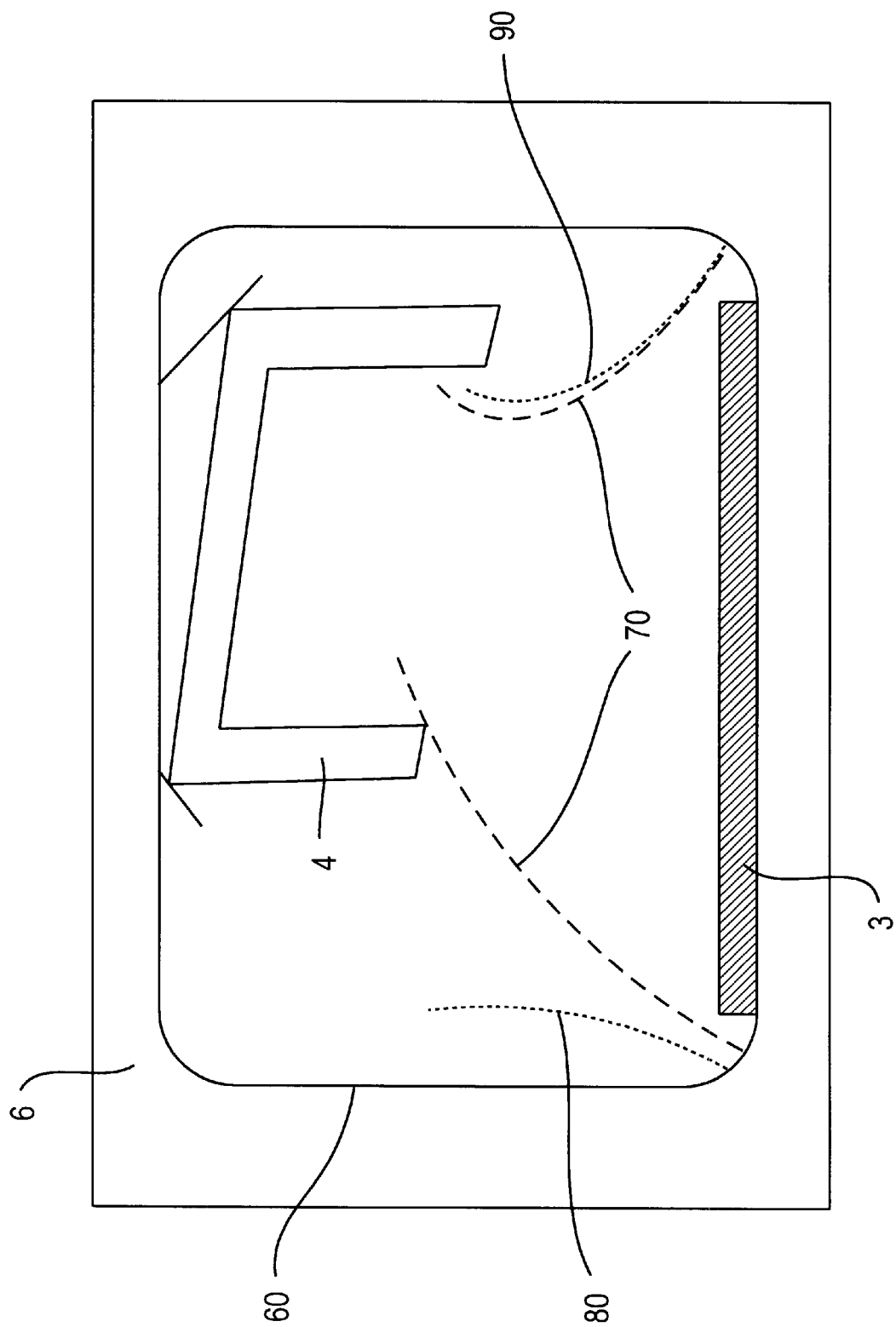
Figure 7:
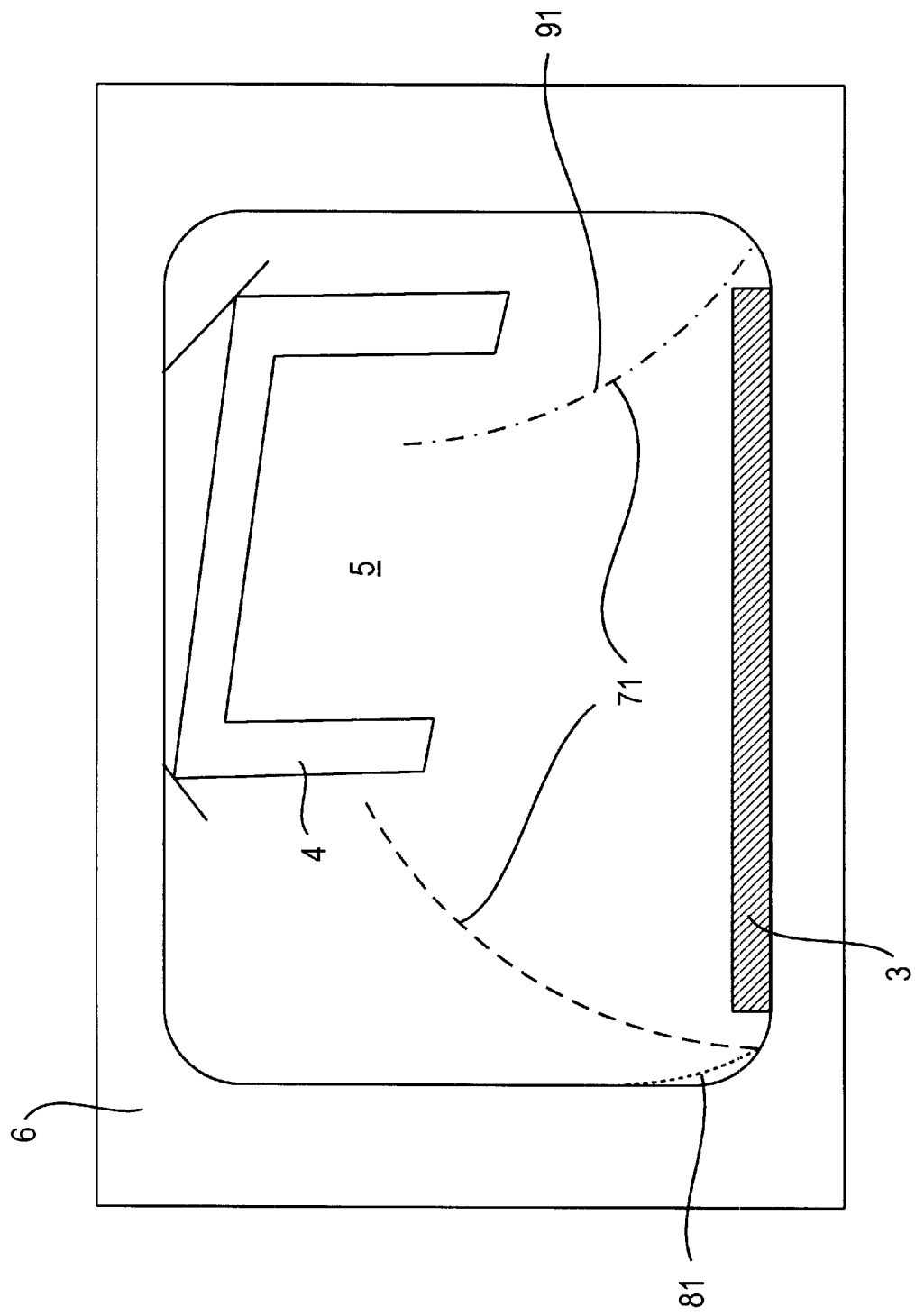

Exemplary embodiments of the invention are shown in the drawing and described in further detail in the ensuing description. Shown are:

FIG. 1, the flow chart for the method of the invention;

FIG. 2, a vehicle in front of a given obstacle, in this case an entrance to a garage;

FIG. 3, an illustration according to the invention of the maneuvering space at the rear as the vehicle drives straight ahead toward the garage entrance;

FIG. 4, an illustration according to the invention of the maneuvering space at the rear along with the garage entrance and an additional display of the maximum possible range of the maneuvering course if the vehicle drives straight in;

FIG. 5, an illustration according to the invention of the maneuvering space at the rear with a curved maneuvering course toward the garage entrance;

FIG. 6, an illustration of the maneuvering space at the rear with a curved maneuvering course toward the garage entrance and an additional display of the maximum possible range of the maneuvering course;

FIG. 7, an illustration of the maneuvering space at the rear with a curved maneuvering course toward the garage entrance and an additional display of the maximum possible range of the maneuvering course, where driving directly into the garage is not possible.

Figure 8:
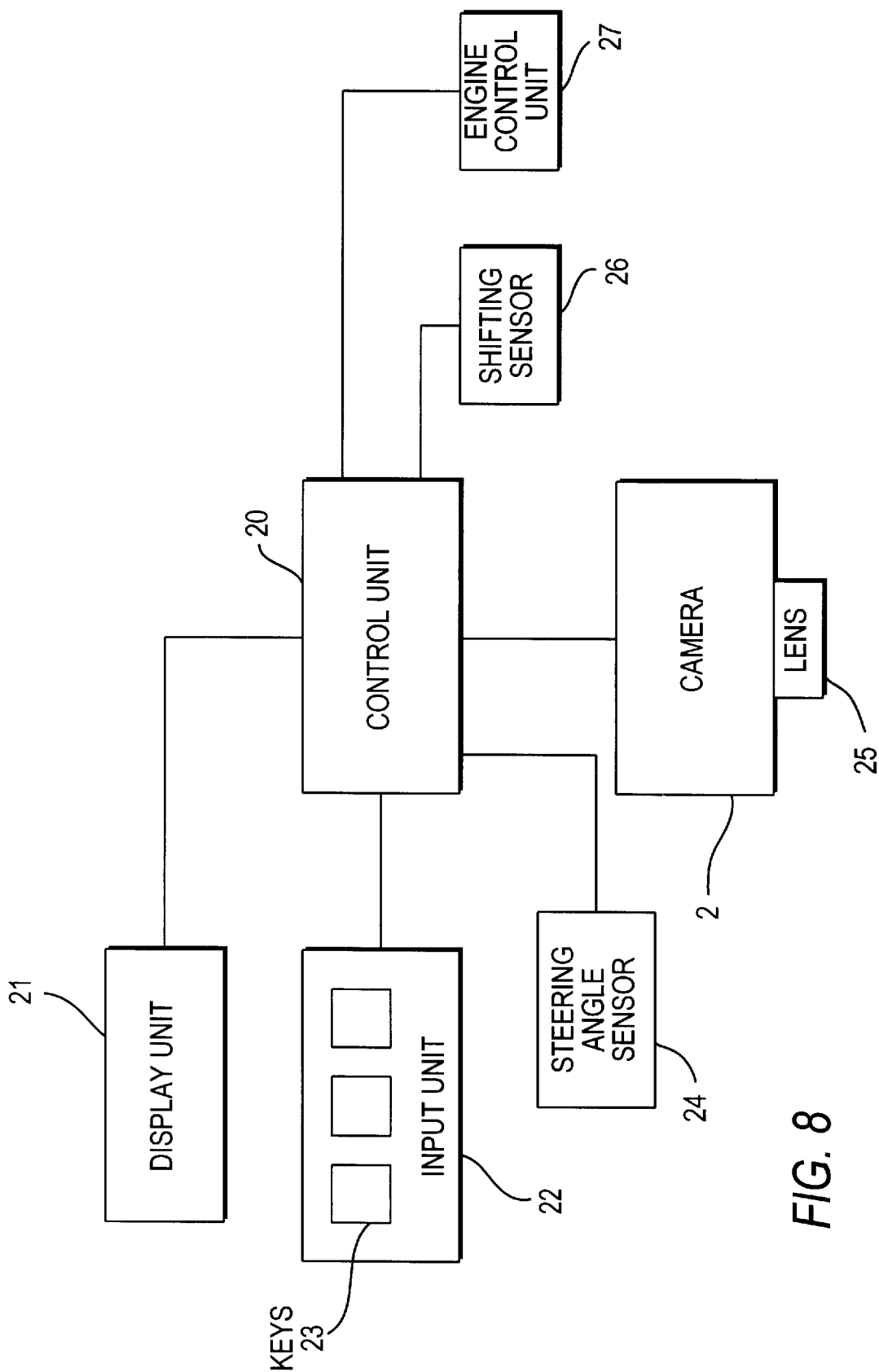

FIG. 8, an apparatus for performing the method of the invention.

DESCRIPTION OF THE EXEMPLARY EMBODIMENT

In FIG. 1, the method according to the invention for displaying maneuvering room is shown. The method begins with an activation step 10; the beginning of the method is tripped for instance automatically upon shifting into reverse, or upon manual request by the user, for instance by pressing a button. In particular, a control unit that regulates the course of the method is activated.

In an ensuing picture-taking activation step 11, a camera used to monitor the maneuvering space at the rear is initialized. Up to an end of the course of the method, the camera now takes a picture of the maneuvering space at the rear of the vehicle. The portion of the maneuvering space at the rear that is detected by the camera is defined by the camera lens. In an ensuing distortion suppression activation step 12, a computer suppression of the picture distortion caused by the camera lens is performed in a processor, to which the picture taken by the camera is sent. Taking the data of the camera lens into account, the peripheral regions of the picture taken are now projected onto the viewing plane of a screen, that for the driver looking at the screen, the interference in the picture from the distortion is severely reduced. Calibration of the computer distortion suppression can be done by placing a rectangular grid in front of the camera and from the output picture determining a transformation function for the picture, so that when the transformation function is applied to the picture, the rectangular grid also appears in the display. This calibration of the computer distortion suppression can already be done at the factory, with the transformation function stored in memory in the processor. From the distortion suppression activation step 12 to the conclusion of the method, distortion suppression of the picture taken by the camera is performed continuously. In another exemplary embodiment of the method of the invention, not shown in the drawing, the method described above and below can also be performed without the distortion suppression activation step 12. In that case no distortion suppressor of the picture is done; on the other hand, the computation effort and expense can be less, since the computer distortion suppression is omitted.

In a first steering angle interrogation step 13, the present actual steering angle in the vehicle is interrogated by the control unit. This is preferably done via a steering angle sensor that is disposed in the region of the steering column or steering shaft of the vehicle. Via a data connection, in particular an electrical data connection, the current steering angle is transmitted to the control unit; the data connection is preferably a standardized data connection, such as a CAN bus. In an ensuing calculation step 14, from the ascertained steering angle a calculation is made of how the maneuvering course of the vehicle in the case of an unchanged steering angle will vary, for instance by projecting the maneuvering course by computer into the travel plane of the vehicle. Furthermore, the maximum range within which the vehicle can drive to the left and right from its instantaneous position upon maximum turning of the steering wheel is calculated. In an ensuing display step 15, both the maneuvering course to be expected if the steering angle is unchanged and the possible range within which the vehicle can travel are projected into the display of the maneuvering space at the rear, and the driver can see this display. If the maneuvering space at the rear is displayed in a freely programmable multipurpose instrument, then the display is incorporated into the screen of the freely programmable multipurpose instrument. In an ensuing first decision step 16, a check is made as to whether the steering angle ascertained in the first steering angle interrogation step 13 has changed compared with a value stored in memory. The first time the first decision step 16 is reached after the activation step 10, a steering angle stored in memory during the activation step 10, which angle is outside the adjustable steering angle of the vehicle, is placed in the memory. If it is found in the first activation step 16 that the present set steering angle deviates from the stored value by more than a predetermined tolerance, then a jump is made to the memory step 19. The predetermined tolerance is determined by the display precision for the maneuvering course to be expected, or for the possible range within which the vehicle can drive. In the memory step 19, the steering angle measured in the first steering angle interrogation step 13 is stored in memory. After that, a jump is again made to the first steering angle interrogation step 13. Conversely, if in the first decision step 16 it is found that the steering angle measured in the first steering angle interrogation step 13 is within a predetermined tolerance range, then a jump is made to the second decision step 17. In the second decision step 17, it is checked whether reverse gear is still selected and whether the motor is still on. If the motor is still on, and the reverse gear is still selected, then from the second decision step 17 a jump is made to a second steering angle interrogation step 130. As in the first steering angle interrogation step 13, the steering angle sensor is interrogated about the steering angle. After that, a further jump is made to the first decision step 16. If conversely it is found in the second decision step 17 that either the reverse gear is not selected or the motor has been deactivated, then the method is ended in a concluding step 18, by termination of the supply of current to the camera, among other actions, and by turning off any display of the maneuvering space at the rear.

In FIG. 2, a vehicle 1 with a camera 2 is shown; the camera 2 is secured in a rear region of the vehicle. The vehicle also has a vehicle bumper 3. The vehicle is located in front of a garage 4, which has a garage entrance 5. The vehicle 1 is to be driven into the garage entrance 5 without touching the walls of the garage 4. To that end, the maneuvering space at the rear is monitored by the camera 2. In general, the camera 2 is unable to monitor the entire maneuvering space at the rear; instead, it detects in particular a part of the maneuvering space at the rear that is important to the driver for monitoring the drive into the garage.

In FIG. 3, part of the maneuvering space at the rear as it is detected by the camera 2 and then displayed by the method of the invention in a display 6 is shown. Here and hereinafter, the same reference numerals also represent the same elements. The display 6 has a screen 60, embodied for instance as a liquid crystal display, so that the driver electronics and the voltage supply as well as the backlighting are disposed inside the display 6, outside the region of the screen 60 or behind it. For orienting the driver, the vehicle bumper 3 is visible here on the screen 60, at the lower edge. The garage 4 is also shown with the garage entrance 5. By the method of the invention, the maneuvering course of the vehicle to be expected if the steering angle is unchanged is incorporated in the form of a first maneuvering course 7 to be expected. Since the first maneuvering course 7 to be expected is just now being driven, the vehicle steering has evidently just been set. Since the first maneuvering course 7 to be expected extends into the garage entrance 5 without intersecting the obstacle, that is, the walls of the garage 4, the driver can now back into the garage entrance 5 without making any further change in the steering angle.

The incorporation of the first expected maneuvering course 7 into the picture is done, as shown in FIG. 3, by means of a dashed line, for instance; an illustration of the dashed line is adapted to the picture background, or in other words the picture of the maneuvering space at the rear. In the dark and up to a predeterminable brightness limit in the display, bright dashed lines are incorporated. If the predeterminable brightness limit is exceeded, for instance in the case of snow, then the dashed lines are incorporated as dark lines. A solid line or a line of symbols, such as circles or diamonds, can also be used for the display.

In FIG. 4, along with the elements already explained in conjunction with FIG. 3, the screen 60 also shows a first possible left boundary 8 and a further first possible right boundary 9 of the maximum possible maneuvering course. From this view, the driver can learn, among other factors, that he will not be able, on the basis of his view of the display on the screen 60, to drive past the garage 4 on the left, for instance in order to park the vehicle next to the garage instead. This is because the first possible left boundary 8 intersects the garage 4, so that even upon maximum turn of the steering to the left, there is no possibility of the vehicle's reaching the space next to the garage 4. In that case, the driver must first increase the distance of the vehicle from the garage 4, so that it will be possible for him to reach the space next to the garage 4 by choosing a suitable maneuvering course. The drive into the garage entrance 5, conversely, can be done without problems.

In FIG. 5, the maneuvering space at the rear of the vehicle is also shown. Compared with FIGS. 3 and 4, the vehicle is now clearly located in a different position relative to the garage 4. The steering is also turned, as can be seen from the curved course of a second expected maneuvering course 70. The second expected maneuvering course 70, however, also leads into the garage entrance 5 without intersecting the garage 4, so that once again the driver can drive the vehicle into the garage entrance 5 without changing the steering angle. If one of the two boundary lines of the second expected maneuvering course 70 were to intersect a side wall of the garage 4 or even extend outside the garage 4, the driver would be obliged to correct the vehicle steering angle until the second expected maneuvering course 70 extends into the garage entrance 5; at that point, he can then drive on into the garage entrance 5 without further correction of the steering angle.

In FIG. 6, compared with FIG. 5, a second possible left boundary 80 and a second possible right boundary 90 of the maximum attainable maneuvering course are also shown. It can be seen that the second maneuvering course 70 expected is located quite close to the second possible right boundary 90 of the maximum attainable maneuvering course, so that here the driver has already used up most of the clearance available to him.

In FIG. 7, both a third expected maneuvering course 71 and a third possible left boundary 81 and a third possible right boundary 91 are shown. The third expected maneuvering course 71 coincides with the third possible right boundary 91. The dotted line for the third possible boundary 91 is therefore coincident with the edge of the third expected maneuvering course 71. In other words, the driver is unable to steer any further to the right. Nevertheless, the third expected maneuvering course 71 is located on one side outside the garage entrance 5. Accordingly in this case the driver does not even need to try to back up directly into the garage entrance 5, because even though a maximum turn angle has already been reached, it is impossible to drive into the garage yet. In that case, the driver has to drive forward first, and then from a greater distance begin again to drive into the garage.

In FIG. 8, an apparatus for performing the method of the invention is shown. A control unit 20 is connected to a display unit 21. The control unit 20 is also connected to a camera 2, which has a camera lens 25. The control unit 20 furthermore has a connection to a steering angle sensor 24, to an input unit 22 with keys 23, to a shifting sensor 26 and an engine control unit 27. The control unit 20 is preferably embodied as a digital processor with a microprocessor and at least one memory unit. The control unit 20 is preferably disposed in the front region of the vehicle. For instance, it can be integrated with a central processor of the vehicle. The display unit 21 is preferably a freely programmable multi-purpose instrument. In particular, the display unit 21 has a display 6 with a screen 60, which are not shown in detail in FIG. 8. However, the display unit 21 can also be an additional display, disposed in the front region of the vehicle and visible to the driver, for instance in the center console of the vehicle. The input 22 with the keys 23 is also located in a region readily accessible to the driver, preferably on the vehicle dashboard. With the keys 23, an independent activation of the observation of the maneuvering space at the rear is possible, or in other words a deactivation of the incorporation of the maneuvering course to be expected or of the maximum possible range within which the maneuvering course can be located. The control unit 20 accesses the steering angle sensor 24, shifting sensor 26 and engine controller 27, preferably via a CAN bus. The steering angle sensor 24, as already explained above, serves to detect the current steering angle. The shifting sensor 26 provides the information as to whether the reverse gear has been selected. The engine controller 27 provides the information as to whether the motor has been turned off. To that end, it is also possible to interrogate an ignition system of the vehicle. The camera 2 has a camera lens 25, which is preferably designed as a wide angle lens. By means of a wide angle lens, the greatest possible portion of the maneuvering space at the rear can be detected by the camera. However, a wide angle lens causes picture distortion, which can be compensated for by an ensuing picture distortion suppression in the control unit 20.

What is claimed is:

1. A method for displaying maneuvering room of a vehicle, in particular a motor vehicle, in which in a first method step, a picture is taken of at least part of the maneuvering space at the rear of the vehicle, and this picture is shown in a display, characterized in that in a second method step, a maneuvering course (7, 70, 71) of the vehicle to be expected if the steering angle is unchanged is ascertained, and in a third method step, the maneuvering course of the vehicle to be expected if the steering angle is unchanged is displayed in the picture, wherein a maximum range (8, 9, 80, 90, 81, 91) within which a possible maneuvering course can be located is displayed, and wherein the maximum range is limited by a maximum turning angle of steering of the vehicle to the left and to right.

2. The method for displaying maneuvering room of claim 1, characterized in that the vehicle maneuvering course (7, 70, 71) to be expected if the steering angle is unchanged is ascertained from an actual steering angle of a steering system of the vehicle.

3. The method for displaying maneuvering room of claim 1, characterized in that the data of a steering angle sensor (24) are detected via a CAN bus.

4. The method for displaying maneuvering room of claim 1, characterized in that along with the portion of the maneuvering space at the rear, at least part of the vehicle bumper (3) is also detected.

5. The method for displaying maneuvering room of claim 1, characterized in that the distortion in the ascertained picture caused by a camera lens (25) is detected, and that distortion suppression of the picture is effected by means of a processor.

6. The method for displaying maneuvering room of claim 1, characterized in that the picture of the maneuvering space at the rear is taken by a camera (2); that an output signal of the camera (2) is output in dependence on the brightness; and that the dependence is specified by means of a nonlinear and in particular logarithmic characteristic conversion curve.

7. The method for displaying maneuvering room of claim 1, characterized in that the display of the picture of the maneuvering space at the rear is effected in a freely programmable multipurpose instrument (21).

8. An apparatus for performing the method of claim 1, characterized in that in a rear region of a vehicle, a camera (2) is provided, with which at least a portion of the maneuvering space at the rear of the vehicle can be detected; that a display (6, 21) that is connected to the camera (2) is disposed in the vehicle (1); that there is a steering angle sensor (24) in the vehicle for ascertaining the actual steering angle; and that a maneuvering course (7, 70, 71) of the vehicle (1) to be expected if the steering angle is unchanged is capable of being shown in the display (6, 21).

9. The apparatus for performing the method of claim 8, characterized in that the apparatus has a control unit (20), which is preferably embodied as a digital processor; and that the display for the maneuvering course (7, 70, 71) to be expected if the steering angle is unchanged, and/or for the range (8, 9, 80, 90, 81, 91) within which the possible maneuvering course can be located is deactivatable via the control unit (20).

10. A method for displaying maneuvering room of a vehicle, in particular a motor vehicle, in which in a first method step, a picture is taken of at least part of the maneuvering space at the rear of the vehicle, and this picture is shown in a display, characterized in that in a second method step, a maneuvering course (7, 70, 71) of the vehicle to be expected if the steering angle is unchanged is ascertained, and in a third method step, the maneuvering course of the vehicle to be expected if the steering angle is unchanged is displayed in the picture, wherein lines for display of the maneuvering course are dark when a brightness limit is exceeded, and wherein the lines for display of the maneuvering course are bright when the brightness limit is not reached.

11. The method according to claim 10, wherein the method is automatically activated upon shifting of the vehicle into reverse.

* * * * *